(12) United States Patent  
Huang et al.

(10) Patent No.: US 9,244,603 B2  
(45) Date of Patent: Jan. 26, 2016

(54) DRAG AND DROP TECHNIQUES FOR DISCOVERING RELATED CONTENT

(71) Applicant: Nook Digital, LLC, New York, NY (US)

(72) Inventors: Chen-Je Huang, Menlo Park, CA (US); Jaireh Tecarro, San Francisco, CA (US); Shaun Saperstein, San Carlos, CA (US)

(73) Assignee: Nook Digital, LLC, New York, NY (US)

( * ) Notice: Subject to any disclaimer, the term of this patent is extended or adjusted under 35 U.S.C. 154(b) by 161 days.

(21) Appl. No.: 13/923,804

(22) Filed: Jun. 21, 2013

(65) Prior Publication Data

US 2014/0380214 A1    Dec. 25, 2014

(51) Int. Cl.
| | |
|---|---|
| *G06F 3/048* | (2013.01) |
| *G06F 3/033* | (2013.01) |
| *G06F 3/0486* | (2013.01) |
| *G06F 3/0488* | (2013.01) |
| *G06F 17/30* | (2006.01) |

(52) U.S. Cl.
CPC ............ *G06F 3/0486* (2013.01); *G06F 3/0488* (2013.01); *G06F 17/30964* (2013.01)

(58) Field of Classification Search
None
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 5,886,698 A * | 3/1999 | Sciammarella et al. | 715/769 |
| 6,259,438 B1 | 7/2001 | Fleck et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |

(Continued)

FOREIGN PATENT DOCUMENTS

EP        0722150 A1    7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Stephen Alvesteffer
(74) *Attorney, Agent, or Firm* — Finch & Maloney PLLC

(57) ABSTRACT

Techniques are disclosed for providing a drag and drop discovery mode in electronic touch sensitive devices. In response to a user dragging and dropping a content icon into a search box, the content discovery mode may perform a search for content similar to that deposited into the search box. The search box may increase in size or change appearance while receiving the content icon. The results of such a search may be displayed to the user with a content discovery animation that shows similar content icons emerging from the search box and populating the device screen. The animation may be accompanied by sound effects. The newly discovered content may be randomly scattered over a portion of the screen, or they may be bundled into groups based on similar characteristics, and each group may be accompanied by a header notifying the user of the characteristics of the group.

21 Claims, 12 Drawing Sheets

(56) References Cited

U.S. PATENT DOCUMENTS

| | | | |
|---|---|---|---|
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2007/0047002 | A1 | 3/2007 | Hull et al. |
| 2007/0271524 | A1* | 11/2007 | Chiu et al. .................. 715/767 |
| 2008/0036747 | A1 | 2/2008 | Hope |
| 2008/0256443 | A1* | 10/2008 | Li et al. ...................... 715/700 |
| 2010/0037261 | A1* | 2/2010 | Ohta et al. ..................... 725/40 |
| 2010/0100854 | A1 | 4/2010 | Russell et al. |
| 2010/0192086 | A1 | 7/2010 | Kocienda et al. |
| 2010/0229130 | A1 | 9/2010 | Edge et al. |
| 2010/0231533 | A1* | 9/2010 | Chaudhri ..................... 345/173 |
| 2010/0259482 | A1 | 10/2010 | Ball |
| 2010/0262659 | A1 | 10/2010 | Christiansen et al. |
| 2010/0299201 | A1* | 11/2010 | Thrasher .................. 705/14.49 |
| 2010/0318895 | A1 | 12/2010 | Steinberger et al. |
| 2011/0199342 | A1* | 8/2011 | Vartanian et al. ............ 345/177 |
| 2011/0258542 | A1 | 10/2011 | Kenney et al. |
| 2012/0005198 | A1* | 1/2012 | Pontier et al. ..... G06F 17/30554 707/723 |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0209878 | A1* | 8/2012 | Park et al. ..................... 707/771 |
| 2012/0221938 | A1 | 8/2012 | Patterson et al. |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0284753 | A1* | 11/2012 | Roberts et al. .................. 725/45 |
| 2012/0311438 | A1 | 12/2012 | Cranfill et al. |
| 2012/0329529 | A1 | 12/2012 | van der Raadt |
| 2013/0016045 | A1 | 1/2013 | Zhao et al. |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |
| 2014/0033135 | A1* | 1/2014 | Lorenz .......................... 715/863 |
| 2014/0096048 | A1* | 4/2014 | Rottler et al. ................. 715/769 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.
"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.
"Bamboo Stylus," Wacom Americas, http://www.wacom.com/en/products/stylus, 5 pages, printed from the Internet on Jun. 20, 2013.
Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.
Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.
"Pen," DuoSense Pen, N-trig Hands-on computing, http://www.n-trig.com/Content.aspx?Page=DigitalPencil, 3 pages, printed from the Internet on Jun. 20, 2013.
"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, KIRUPA.COM, http://www.kirupa.com/html5/easing_functions_css3.htm, 16 pages, printed from the Internet on Jun. 18, 2013.
"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.
"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.
"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do WACOM tablets work?," tablet4u.co.uk, http://www.tablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.
"Padblue 2," Brando—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.
"Bluetooth 4.0 SmartPen the future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.cominew-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

(56) References Cited

OTHER PUBLICATIONS

"Stylus Hanging Bluetooth Headset," BRANDO—mobile.brando. com, http://mobile.brando.com/prod_detail.php? prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.

Kanai, et al., "Intra-Rendition Navigation," Copyright 2012-2013 International Digital Publishing Forum (IDPF), 13 pages.

explaining how the sPen tech works (and is very diff than other styluses)," http://forum.xda-developers.com/showthread.php?t=," 1 page, printed from the Internet on Jan. 15, 2013.

\* cited by examiner

DRAG AND DROP TECHNIQUES FOR DISCOVERING RELATED CONTENT

FIELD OF THE DISCLOSURE

This disclosure relates to electronic display devices, and more particularly, to user interface (UI) techniques for interacting with touch screen devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
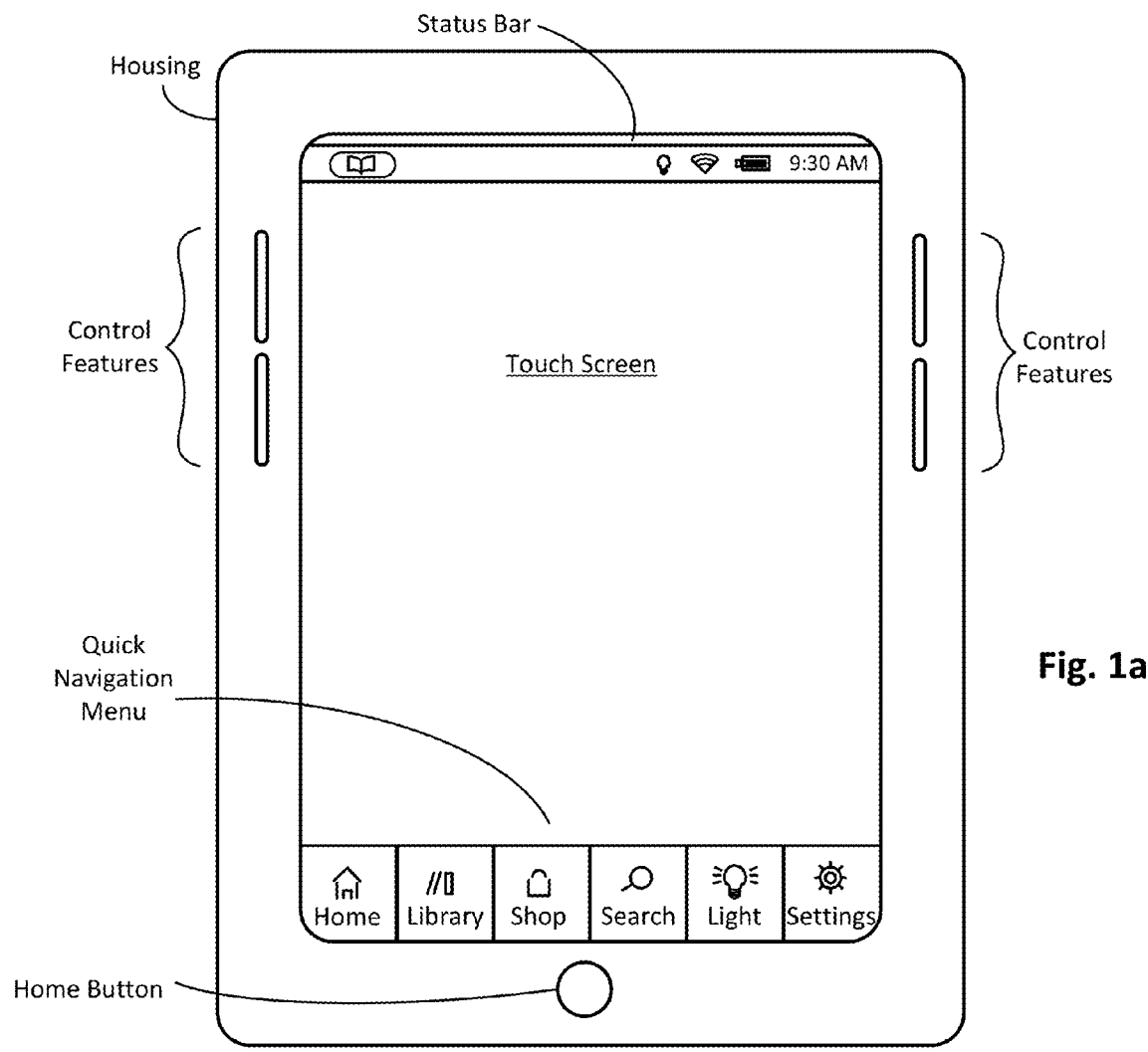
FIGS. 1a-b illustrate an example electronic touch screen device having a drag and drop discovery mode configured in accordance with an embodiment of the present invention.

Techniques are disclosed for providing a drag and drop discovery mode in electronic touch sensitive devices. In response to a content search query, the content discovery mode may perform a search for content similar to the content searched. The search query may be identified by a user dragging and dropping a content icon into a search box or slot presented on the display screen. The search box may increase in size or change appearance while receiving the content icon. As the content icon is dropped into the search box, it may disappear as if it were being placed into a drop box or mail slot. The results of such a search may be displayed to the user with a content discovery animation that shows similar content icons emerging from the search box and populating the device display screen. The animation may show the similar content icons gliding over the screen, bouncing off each other or off the edges of the screen until they settle into position on the screen. In some cases, the animation may be accompanied by sound effects. The icons of the newly discovered content may be randomly scattered over a portion of the screen, or they may be bundled into groups based on similar characteristics. Each group of similar content may be accompanied by a header notifying the user of the characteristics of the group. The type of content returned in response to a given search query may be user-configurable to some degree.

General Overview

As previously explained, electronic display devices such as tablets, eReaders, and smart phones are commonly used for displaying user interfaces and consumable content. The user of such devices can typically consume the displayed content with relative ease. In some instances, the user may wish to browse and/or discover new content through the electronic device. While available search and discovery techniques are commonly provided with touch screen devices for such purposes, a drag and drop discovery mode as described herein may provide a more unique and playful user experience, or otherwise enhance the user experience.

Thus, and in accordance with an embodiment of the present invention, drag and drop discovery techniques are disclosed for use in electronic touch screen devices. In some embodiments, a user may wish to use an electronic device to browse or discover content that may be located on the device, or on a remote database. Examples of such databases include an online shopping database, a library catalog, a university's bookstore listing, an online audio/video store or streaming website, just to name a few. By dropping a first piece of content into the search box of the electronic device, a search for similar content may be performed and a discovery technique may display similar content to the user. As a piece of content is being deposited into the search box, the search box may increase in size or otherwise change appearance in some embodiments. In some embodiments, the entry point of the drag and drop discovery mode can be a search icon instead of a search box, and the search icon can transform into a search box so that the content icon can slide in.

Instead of displaying related content in a list format or requiring the user to navigate through one or more menus to discover related content, such content may be displayed to the user in a more playful way by showing it flowing out of the search box onto the screen in response to depositing a first content icon into the search box. In one particular example, the entry point of the drag and drop discovery mode is a search icon, the search icon transforms into a search box, the newly discovered content is shown emerging from the search box, and the search box then returns to being a search icon. The drag and drop discovery animation described herein may allow users to browse content in a surprising and unique way, or otherwise enhance the user experience. In some embodiments, the search box is pervasive in the global user interface (UI) of the device, making the drag and drop content discovery feature easily accessible throughout the user interface of the device. In other embodiments, a search query may be typed into the search box, instead of dragging a content icon into the search box, and the results of the query may be displayed to the user with the content discovery animation described herein.

In some embodiments, related content may include content within the same genre, content by the same author or source, content that other online consumers purchased or liked, and/or different adaptations of a work being searched, just to give a few examples. Such related content features may be user-configurable, in some embodiments, thereby giving the user a greater degree of control as to the type of search results returned. In some cases, the similar content may be uniformly scattered over all or a portion of the device screen, while in other cases the content may be clustered or otherwise organized into groups based on user-configured or otherwise predetermined characteristics. When the discovery animation shows the content icons emerging from the search box, they may glide over the screen and bounce off one another or off the edges of the device as they decrease in speed and come to rest on the screen, in some embodiments. The similar content icons may be organized into groups, but they need not be aligned rigidly into a grid or block of icons. In order to highlight the newly discovered content to the user, the similar content icons may appear in the foreground and any other content or application icons may have a diminished appearance (partially shaded, shaded in a lighter color or tone, appearing partially transparent, or moved into a background frame with respect to the newly discovered content).

Given the global nature and/or uniqueness of the engagement mechanism, in accordance with some embodiments, the drag and drop discovery mode can be similarly invoked within multiple diverse applications (e.g., online shop, picture viewer, file manager, etc.) and without conflicting with other global gestures that might also be used by the device's operating system. The gestures can be performed, for example, with the tip of a finger or a stylus, or any other suitable implement capable of providing a detectable drag and drop gesture. Other embodiments may be implemented using a computer system without a touch-sensitive interface. For example, a desktop configured with an interactive monitor (non-touch screen) could be used, where the user mouse-clicks and drags content to the search box.

Architecture

Figure 1B:
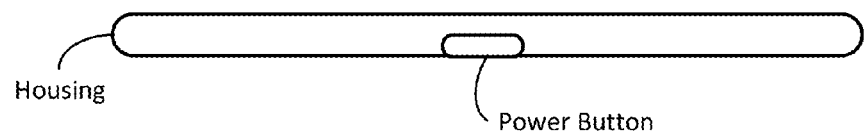

FIGS. 1a-b illustrate an example electronic touch sensitive device having a drag and drop discovery mode configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated, the claimed invention is not intended to be limited to any specific kind or type of electronic device.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device, such as a drag and drop discovery mode, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
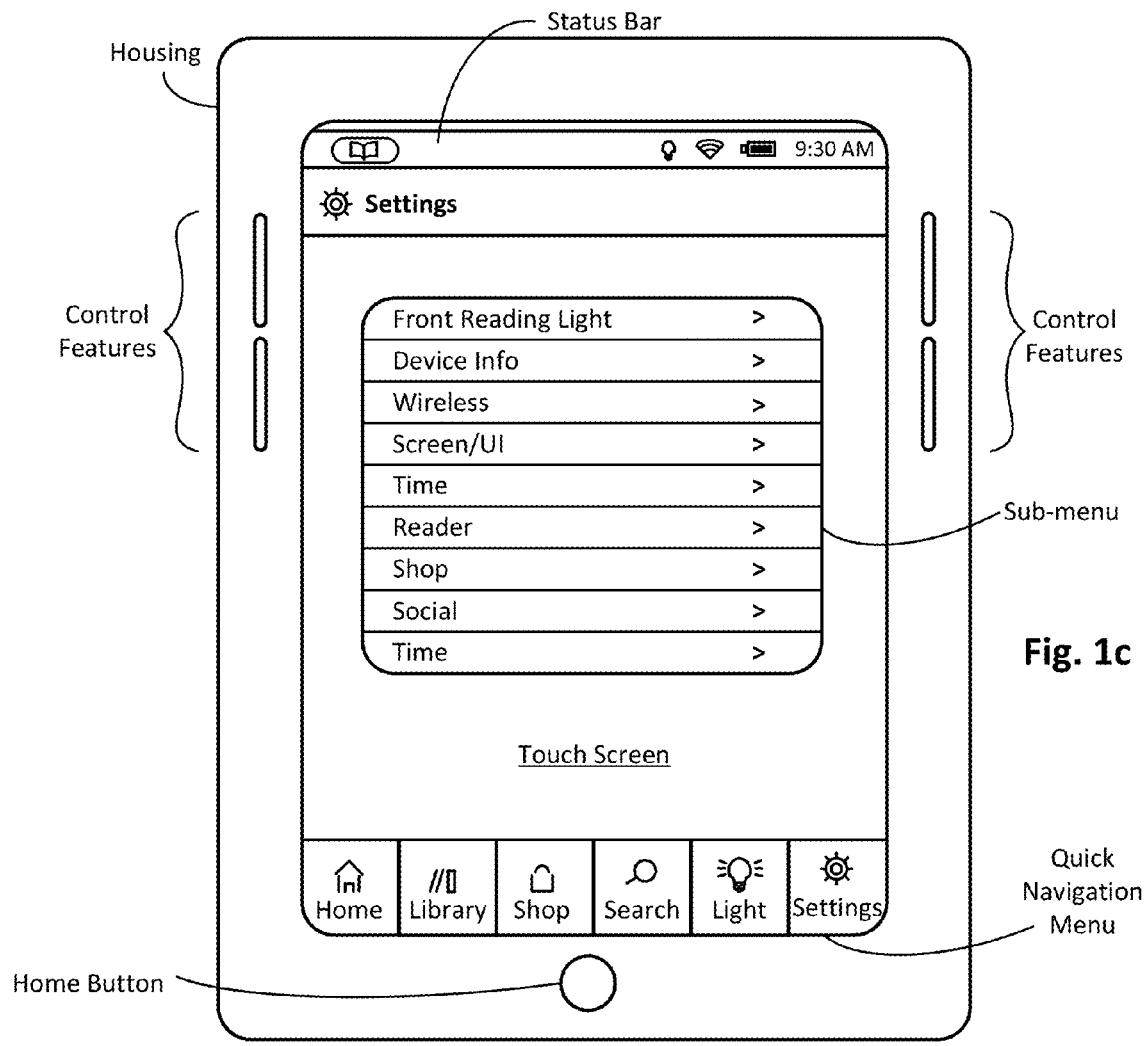
FIGS. 1c-d illustrate example configuration screen shots of the user interface of the electronic touch screen device shown in FIGS. 1a-b, configured in accordance with an embodiment of the present invention.
Figure 1D:
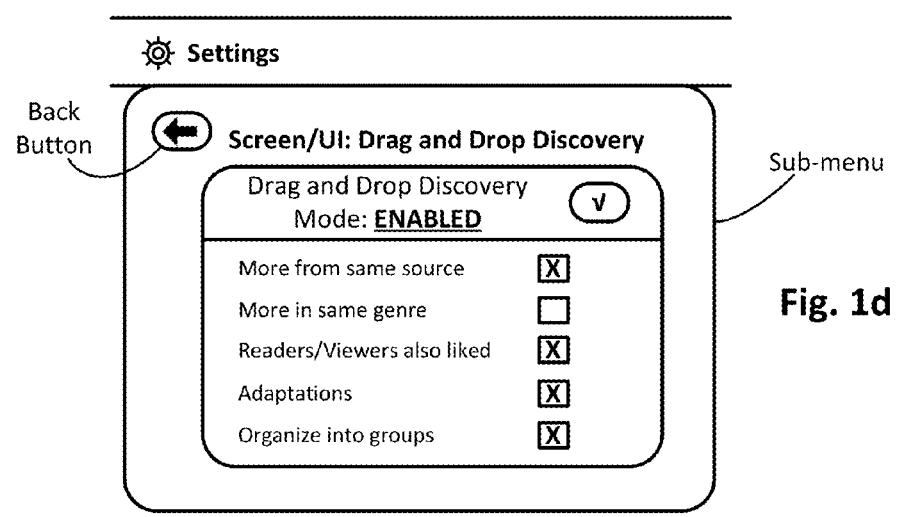

In one particular embodiment, a drag and drop discovery mode configuration sub-menu, such as the one shown in FIG. 1d, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu item may cause the configuration sub-menu of FIG. 1d to be displayed, in accordance with an embodiment. In other example embodiments, selecting the Screen/UI option may present the user with a number of additional sub-options, one of which may include a so-called "Drag and Drop Discovery" option, which may then be selected by the user so as to cause the drag and drop discovery mode configuration sub-menu of FIG. 1d to be displayed. Any number of such menu schemes and nested hierarchies can be used, as will be appreciated in light of this disclosure. In other embodiments, the drag and drop discovery function is hard-coded such that no configuration sub-menus are needed or otherwise provided (e.g., discovering related content by dragging content into a search box as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, etc.). In some instances, note that the user need not actually physically touch the touch sensitive device to perform an action. For example, the touch screen display may be configured to detect input based on a finger or stylus hovering over the touch sensitive surface (e.g., within 3 inches of the touch screen). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1c and 1d, once the Settings sub-menu is displayed (FIG. 1c), the user can then select the Screen/UI option. In response to such a selection, the drag and drop discovery mode configuration sub-menu shown in FIG. 1d can be provided to the user. The user can configure a number of functions with respect to the drag and drop discovery mode, in this example embodiment. For instance, in this example case, the configuration sub-menu includes a UI check box that when checked or otherwise selected by the user, effectively enables the drag and drop discovery mode (shown in the enabled state); unchecking the box disables the mode. Other embodiments may have the drag and drop discovery mode always enabled, or enabled by a physical switch or button located on the device, for example. In some embodiments, the user may guide the discovery process by configuring a number of characteristics that should be searched for. In this example, the types of similar content that are displayed to the user may be selected using a UI check box associated with the content characteristic. For instance, the user may select the appropriate check boxes in order to find more content from the same source (e.g., author, artist, director), more content in the same genre, content that other readers also liked, or adaptations of a specific work. In this particular embodiment, the user has checked the appropriate UI boxes in order to discover more content from the same source, content that other readers or viewers liked, and adaptations of the work being searched. The categories listed herein and illustrated in FIG. 1d are for demonstrative purposes only, and many other categories and content characteristics will be apparent in light of this disclosure. In addition, the user may choose to organize the newly discovered content into groups based on one or more selected characteristics. In this particular example, the user has enabled this option which will provide added structure to the content discovery process. In some embodiments, each group may be outlined or identified with an appropriate header or title.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1d is presented merely as an examples of how a drag and drop discovery mode may be configured by the user, and numerous other configurable or hard-codable aspects will be apparent in light of this disclosure.

Figure 2A:
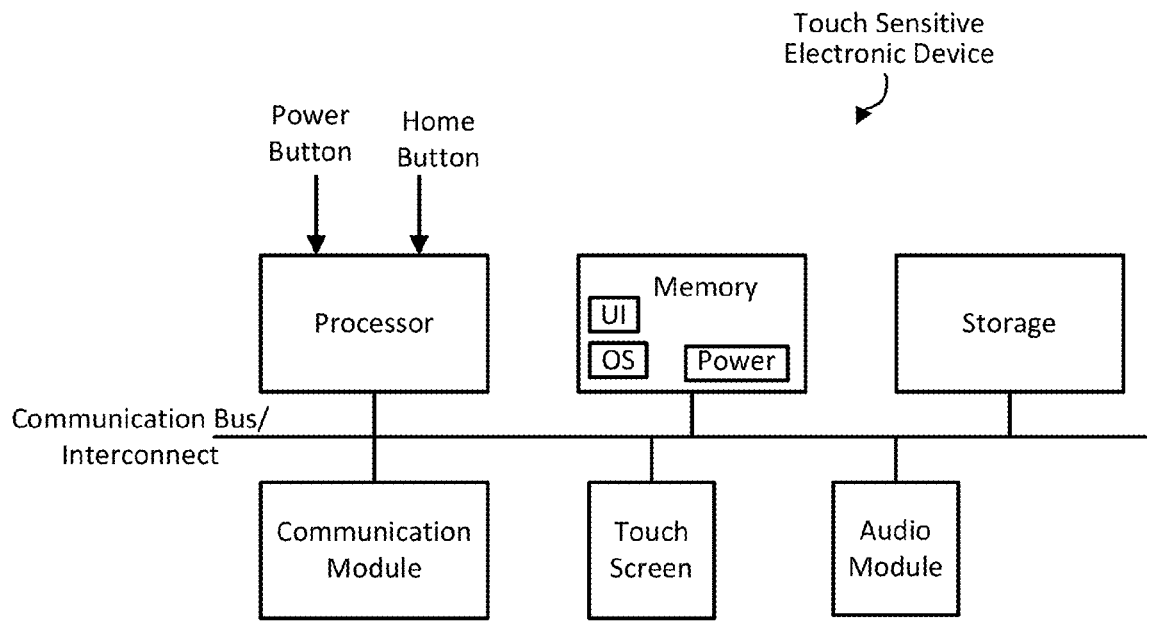
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's contact (direct or proximate) with the screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a drag and drop discovery mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gatelevel logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touchscreen interface technology. The communications module can be, for instance, any suitable 802.11b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots and use-case scenarios shown in FIGS. 1a, 1c-d, 3a-c, 4a-c, 5a-c, and 6a-c, and in conjunction with the drag and drop discovery mode methodologies demonstrated in FIG. 7, which will be discussed in turn. The audio module can be configured, for example, to speak or otherwise aurally present a selected eBook or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
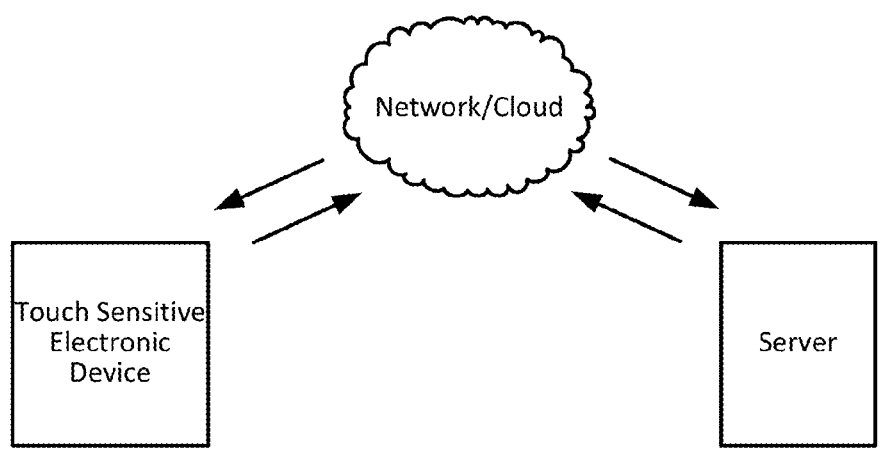
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. In some such embodiments, the server is configured to remotely provision a drag and drop discovery mode as provided herein to the touch screen device (e.g., via JavaScript or other browser based technology). In other embodiments, portions of the drag and drop discovery methodology are executed on the server and other portions of the methodology are executed on the device. Numerous server-side/client-side execution schemes can be implemented to facilitate a drag and drop discovery mode in accordance with an embodiment, as will be apparent in light of this disclosure.

Drag and Drop Discovery Mode Examples

Figure 3A:
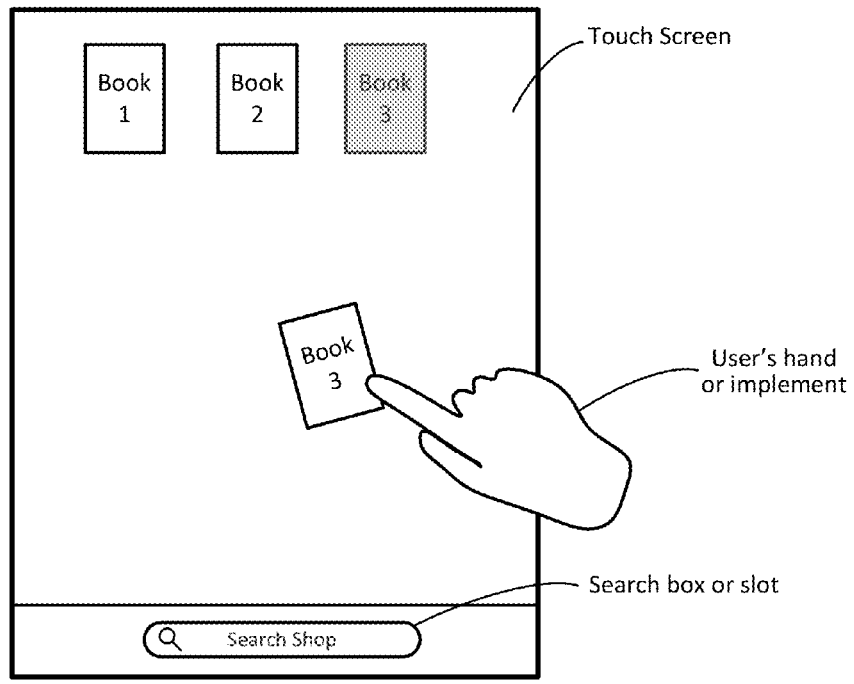
FIGS. 3a-c illustrate an example drag and drop discovery mode of an electronic touch screen device, in accordance with an embodiment of the present invention.
Figure 3B:
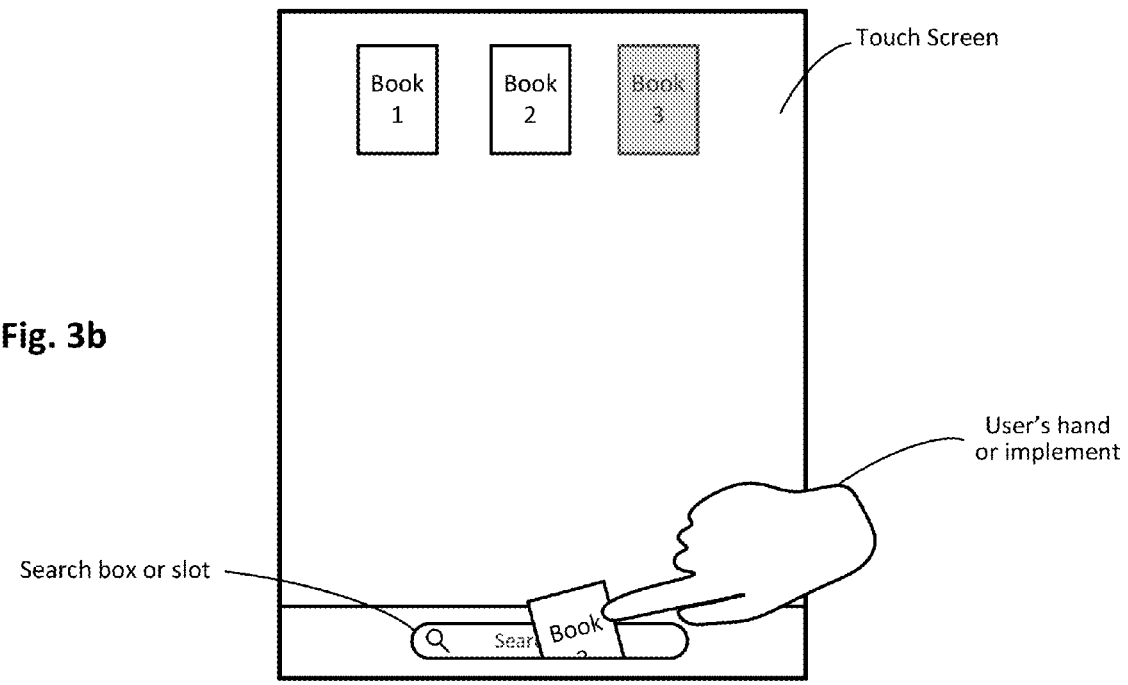
Figure 3C:
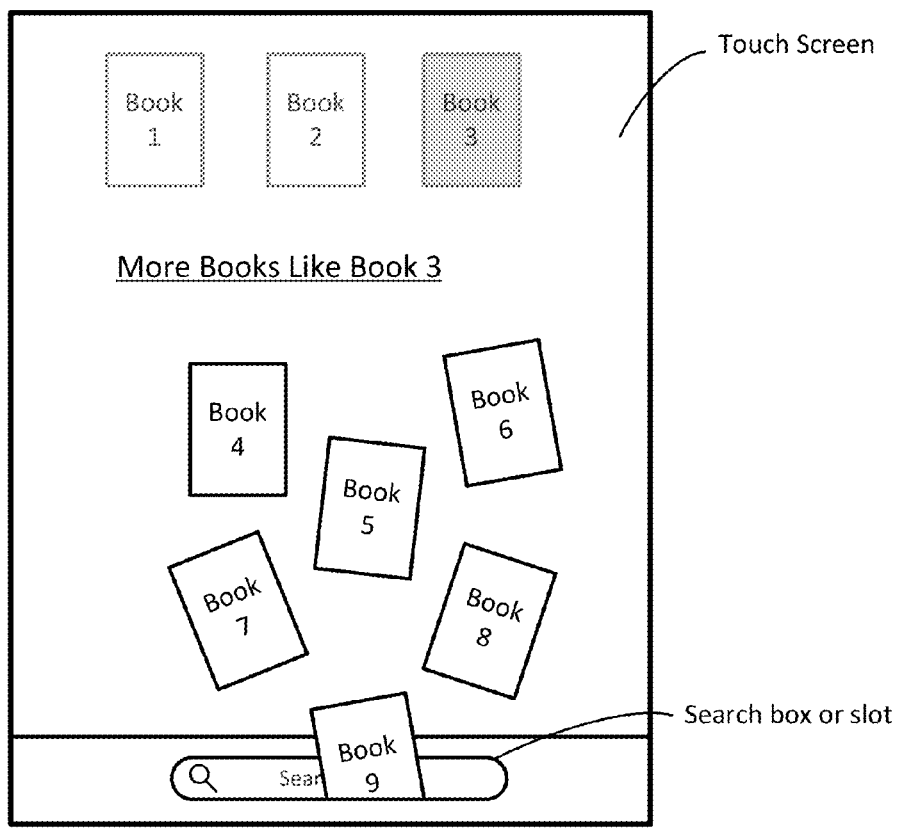

FIGS. 3a-c collectively illustrate an example drag and drop discovery mode that can be applied to a touch sensitive display of an electronic device, in accordance with an embodiment of the present invention. As can be seen in FIG. 3a, the touch screen of the device is displaying three book icons, books 1-3, as well as a search box at the bottom of the screen. In some embodiments, the search box is pervasive in the UI of the device and the user may perform a search by depositing a piece of content into the search box, or by entering a search term or query. In this particular example, the search box is configured to search within an online shop, while in other embodiments the search box may search the contents of the device or some other remote or local database. The user may interact with the touch screen using a finger, an active or passive stylus, or any other suitable implement. In this example, the user has selected book 3 and is dragging it across the touch screen toward the search box. When the user begins dragging the book icon from its original location, a shaded icon may remain in the original location until the user completes the drag-and-drop gesture, in some embodiments. The search box may function as a drop slot into which the book icon may disappear when the user deposits it, as shown in the example of FIG. 3b.

In this example, by dropping the book 3 icon into the search box the device is prompted to search an online shop or database for content similar to book 3. Examples of similar content may include books by the same author, books with a similar writing style, books within the same genre (e.g., history, travel, or cooking), or any content that shares an identifiable characteristic with book 3. Once the shop or database has been searched for similar content, the results of that search may be displayed to the user with a discovery animation that shows the related content emerging from the search box, as shown in the example of FIG. 3c. In this particular example, books 4-9 share similar characteristics with book 3, and the discovery animation shows them spring out of the search box and come to rest on the touch screen of the device. The animation may show the book icons gliding over the device screen or bouncing off each other or off the edges of the screen as they are decelerating, in some embodiments. In one embodiment, a header reading "More Books Like Book 3," or some other suitable message, may be displayed to identify the newly discovered content. In this example, the original three books displayed on the screen may be shaded, become semi-transparent, move into a background frame, or otherwise have a diminished appearance once the newly discovered content is displayed to the user. Pressing the home button, in some embodiments, may cause the device to exit the drag and drop discovery mode and resume displaying only the original books 1-3 shown in FIG. 3a. In other embodiments, a close button may be displayed on the screen and may be used to exit the drag and drop discovery mode. In some embodiments, the drag and drop discovery animation may be accompanied by a sound effect which may be user configurable or hard-coded. If the quantity of search results is significant such that they cannot be displayed on one page, scroll bars may be provisioned to effectively extend that page to accommodate the search results. Alternatively, the user can be prompted with a Next Page icon to see the next set of search results.

Figure 4A:
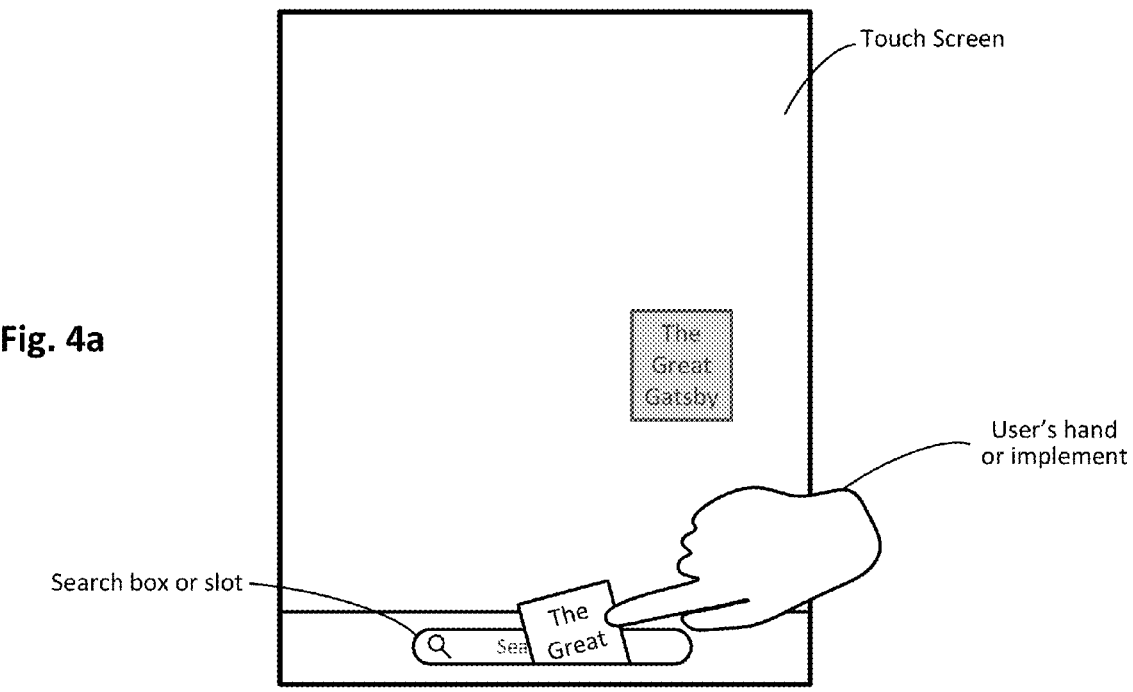
FIGS. 4a-c illustrate an example drag and drop discovery mode of an electronic touch screen device, in accordance with another embodiment of the present invention.
Figure 4B:
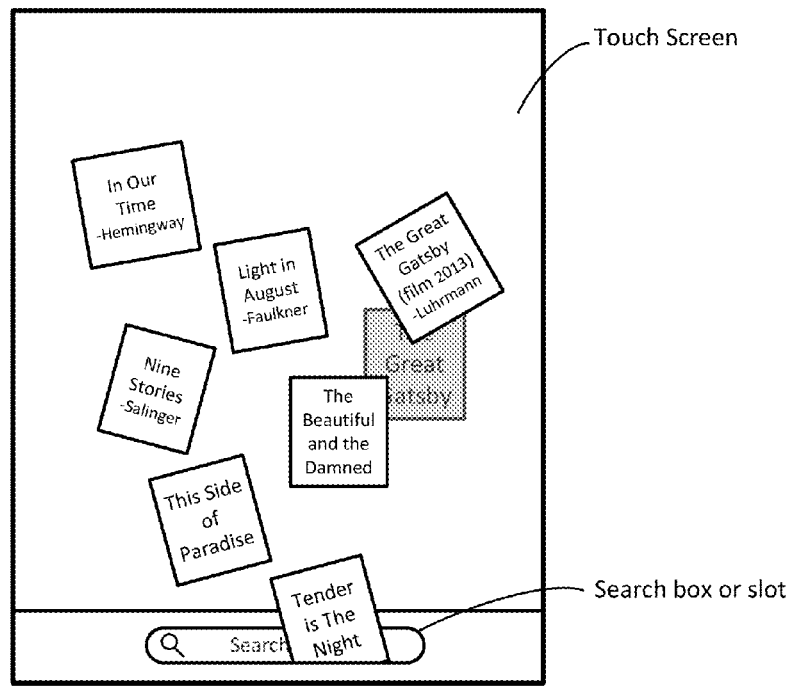
Figure 4C:
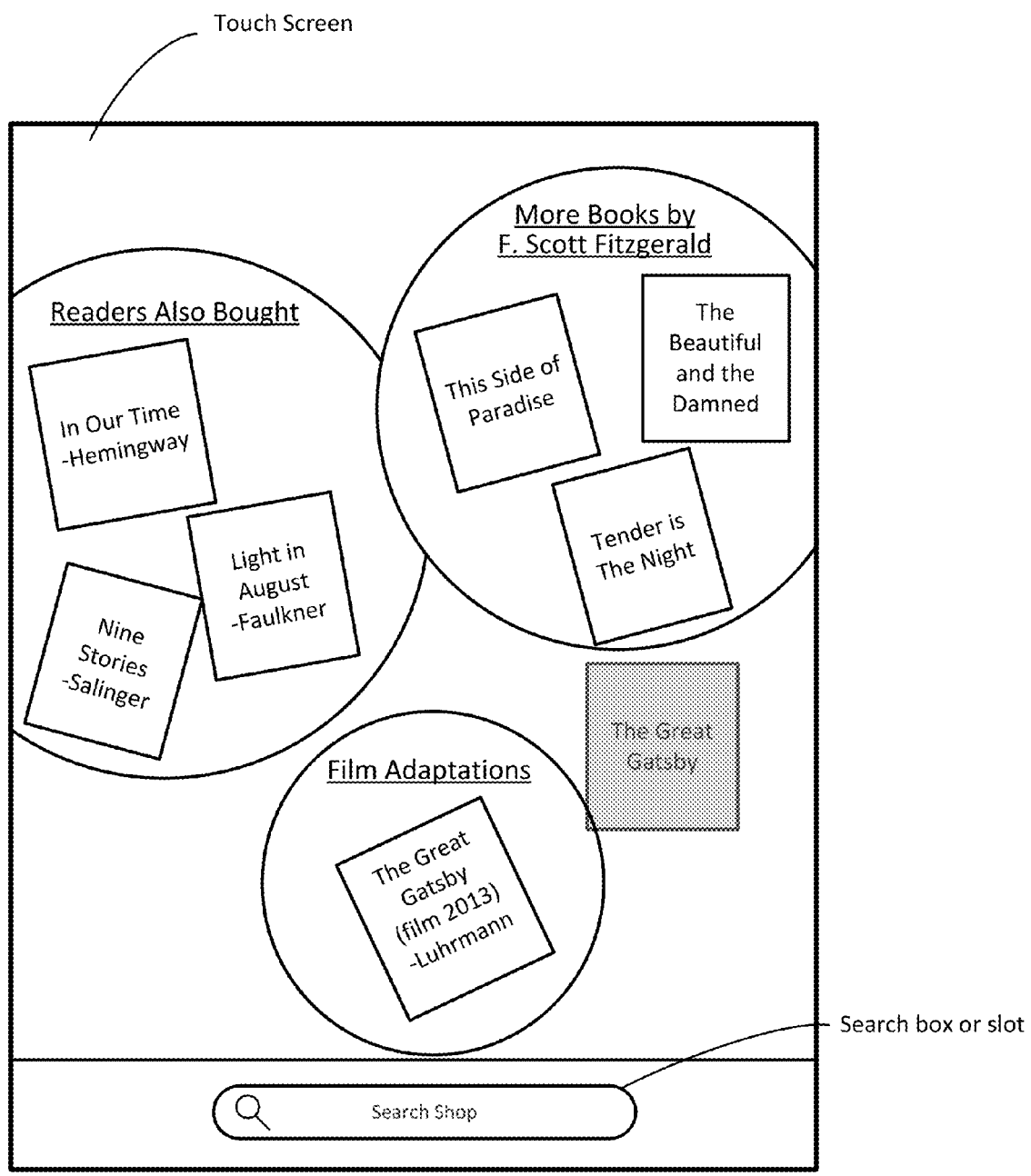

FIGS. 4a-c collectively illustrate another example drag and drop discovery mode that can be applied to a touch sensitive display of an electronic device, in accordance with an embodiment of the present invention. As can be seen in FIG. 4a, the touch screen of the device is displaying the book *The Great Gatsby*, as well as a search box at the bottom of the screen. In some embodiments, the search box is pervasive in the global UI of the device and the user may perform a search by depositing a piece of content into the search box, or by entering a search term or query. In this particular example, the search box is configured to search within an online shop, while in other embodiments the search box may search the contents of the device or some other remote or local database. The user may interact with the touch screen using a finger, an active or passive stylus, or any other suitable implement. In this example, the user has selected the book icon and is depositing it into the search box. When the user begins dragging the book icon from its original location, a book icon that is shaded or otherwise diminished in appearance may remain in the original location while the user performs the drag-and-drop gesture, in some embodiments. In this example, the search box may function as a drop slot into which the book icon may disappear when the user deposits it.

In this example, by dropping the book icon into the search box the device is prompted to search an online shop or database for content similar to *The Great Gatsby*. In some embodiments, an online shop or database may track the purchases of online shoppers in order to identify similarities between products available in the online store. For example, if many shoppers who purchased *The Great Gatsby* also purchased *Light in August*, by William Faulkner (either during the same shopping session or at a previous time), the two books may be identified as similar and may be shown to the user in a drag and drop discovery mode. In this example, the similar content search has identified books by the same author, a movie adaptation of the book, and books that were also purchased by online shoppers who purchased *The Great Gatsby*. Once the database has been searched for similar content, the results may be displayed to the user with a discovery animation that shows the similar content emerging from the search box, as shown in FIG. 4b. In this example, in order to highlight the newly discovered content, the original book icon for *The Great Gatsby* appears shaded and in a background frame with respect to the discovered content.

In this example, the animation may show the content icons gliding over the device screen and eventually coming to rest in separate groups based on similar characteristics. As can be seen in FIG. 4c, three groups are identified to the user, each encircled and identified with an appropriate header. Separating the newly discovered content into groups may provide structure to the content discovery process or otherwise enhance the user experience. Furthermore, in some cases the user can repeat the discovery process in the result, especially when the results are displayed in groups. In such an example, the user may pick a group of content and drop it back into the search box or icon. In this particular example, the group labeled "Readers also Bought" includes books that were purchased by other online shoppers who purchased *The Great Gatsby*; the group labeled "More Books by F. Scott Fitzgerald" includes a selection of other books by that author; and the group labeled "Film Adaptations" includes a 2013 film adaptation of *The Great Gatsby*. In some embodiments, the drag and drop discovery animation may be accompanied by a sound effect which may be user configurable or hard-coded.

Figure 5A:
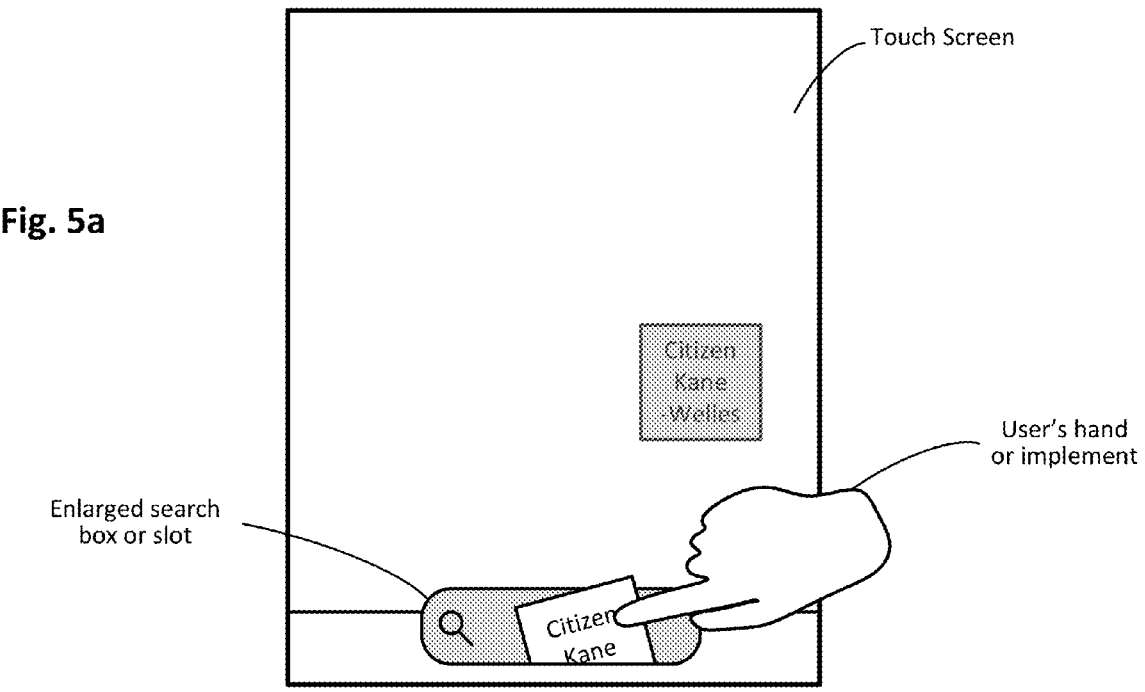
FIGS. 5a-c illustrate an example drag and drop discovery mode of an electronic touch screen device, in accordance with another embodiment of the present invention.
Figure 5B:
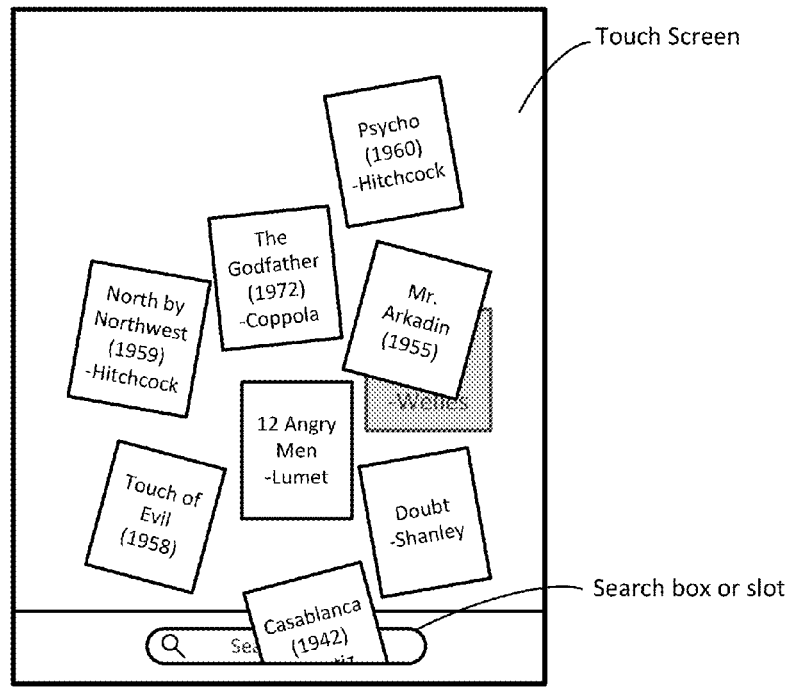
Figure 5C:
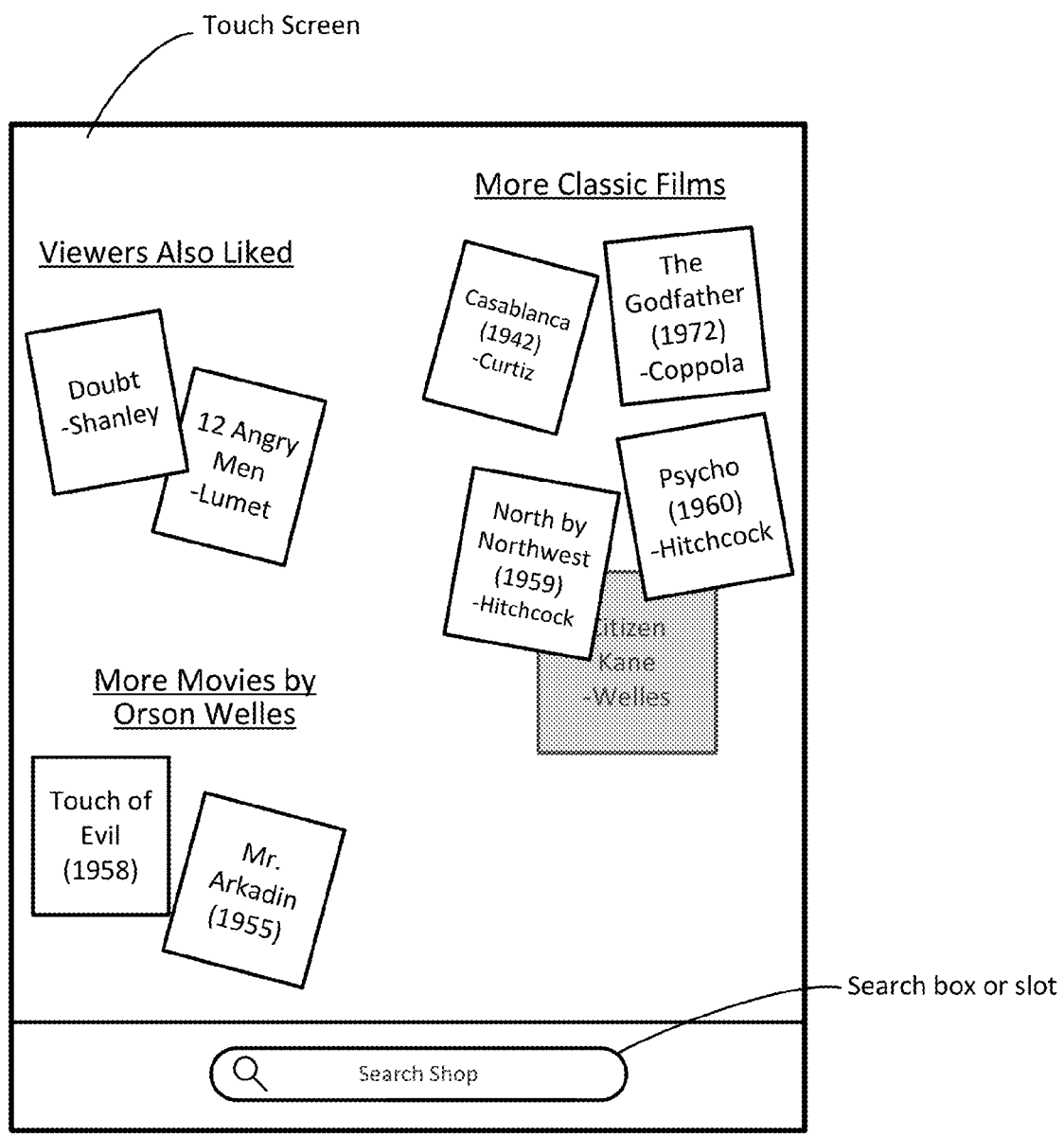

FIGS. 5a-c collectively illustrate another example drag and drop discovery mode that can be applied to a touch sensitive display of an electronic device, in accordance with an embodiment of the present invention. As can be seen in FIG. 5a, the touch screen of the device is displaying the movie Citizen Kane, as well as a search box at the bottom of the screen. In some embodiments, the search box is pervasive in the UI of the device and the user may perform a search by depositing a piece of content into the search box, or by entering a search term or query. In this particular example, the search box is configured to search within an online movie or music database, while in other embodiments the search box may search the contents of the device or some other remote or local database. The user may interact with the touch screen using a finger, an active or passive stylus, or any other suitable implement. In this example, the user has selected the movie icon and is depositing it within the search box. When the user begins dragging the movie icon from its original location, a movie icon that is shaded or otherwise diminished in appearance may remain in the original location while the user performs the drag-and-drop gesture, in some embodiments. In this example, the search box not only receives the content icon, but the search box is shown enlarged in order to more easily receive the content icon.

In this example, by dropping the movie icon into the search box the device is prompted to search an online database for content similar to Citizen Kane. In some embodiments, an online shop or database may track reviews and ratings by online shoppers or content viewers/listeners in order to identify similarities between books, movies, and songs for example. For example, if many people who rated Citizen Kane highly (e.g., >7 on a scale of one to ten) also gave high ratings to the movie 12 Angry Men, the two movies may be identified as similar and may be shown to the user in a drag and drop discovery mode. In this example, the similar content search has identified movies that were also highly rated by those who gave high ratings to Citizen Kane, other movies directed by Orson Welles, and other classic movies. Once the database has been searched for similar content, the results may be displayed to the user with a discovery animation that shows the similar content emerging from the search box, as shown in FIG. 5b. In this example, in order to highlight the newly discovered content, the original movie icon for *The Great Gatsby* is shaded and appears in a background frame with respect to the discovered content.

In this example, the animation may show the content icons gliding over the device screen and eventually coming to rest in separate groups based on similar characteristics. As can be seen in FIG. 5c, three groups are identified to the user, each identified with an appropriate header. Separating the newly discovered content into groups may provide structure to the content discovery process or otherwise enhance the user experience. As discussed above, in some cases the user can repeat the discovery process in the result, especially when the results are displayed in groups, by dropping a group of content into the search box or icon. In this particular example, the group labeled "Viewers Also Liked" includes books that were highly rated by others who gave high ratings to Citizen Kane; the group labeled "More Movies by Orson Welles" includes a selection of other movies by that director; and the group labeled "More Classic Films" includes a selection of other classic American films.

Figure 6A:
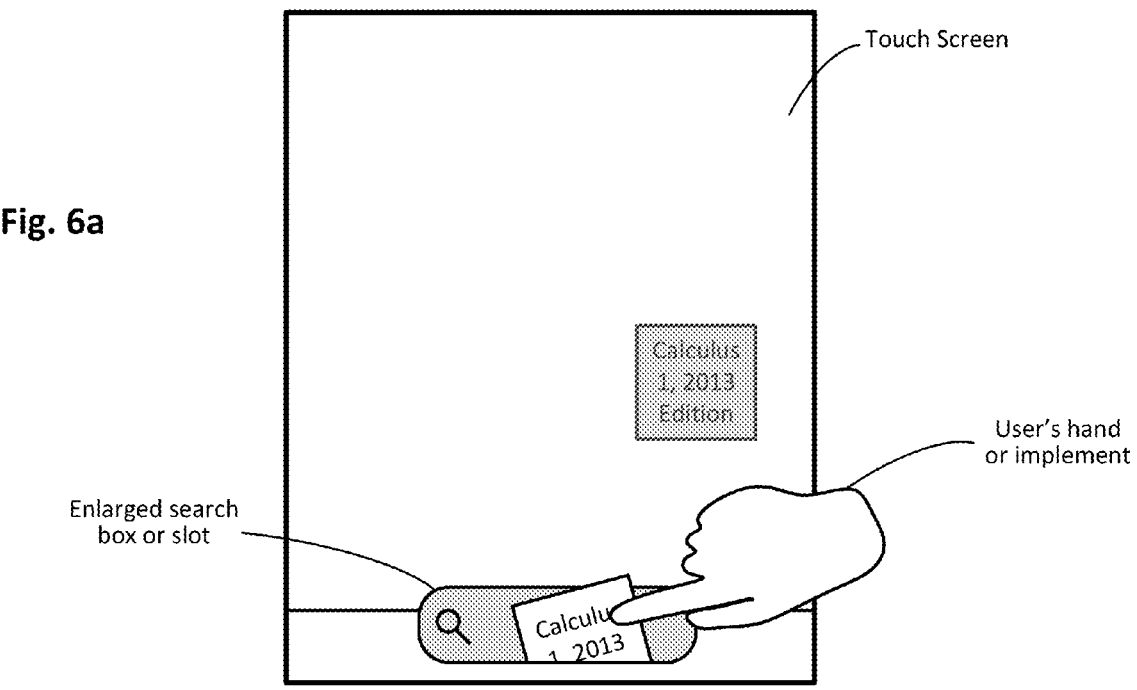
FIGS. 6a-c illustrate an example drag and drop discovery mode of an electronic touch screen device, in accordance with another embodiment of the present invention.
Figure 6B:
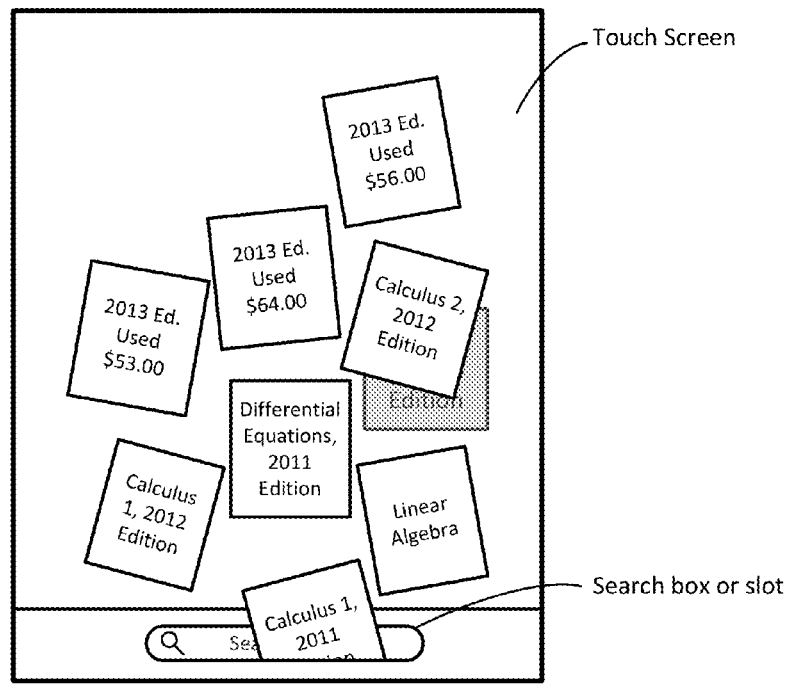
Figure 6C:
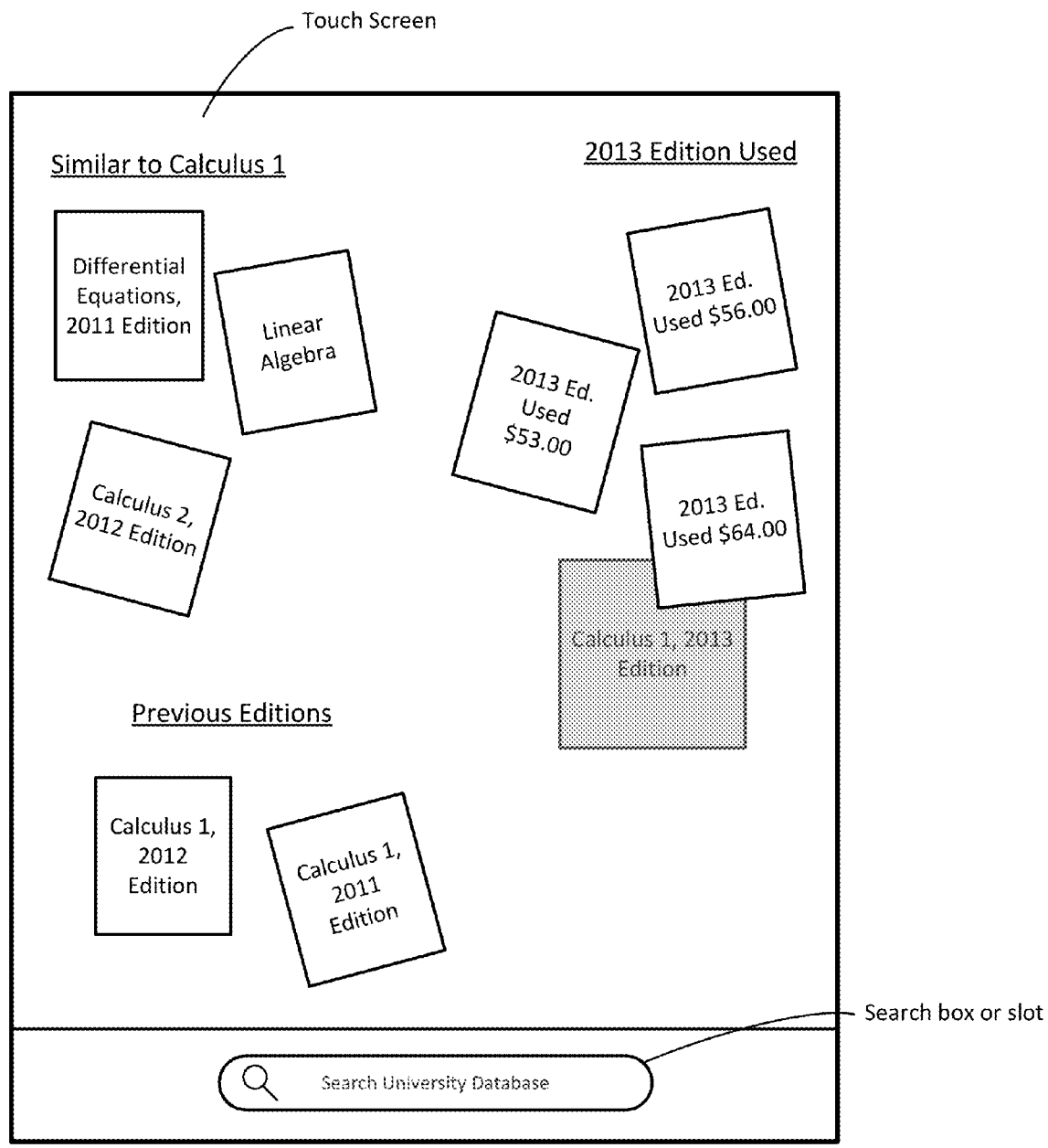

FIGS. 6a-c collectively illustrate another example drag and drop discovery mode that can be applied to a touch sensitive display of an electronic device, in accordance with an embodiment of the present invention. As can be seen in FIG. 6a, the touch screen of the device is displaying the textbook *Calculus* 1, 2013 *Edition*, as well as a search box at the bottom of the screen. In some embodiments, the search box is pervasive in the UI of the device and the user may perform a search by depositing a piece of content into the search box, or by entering a search term or query. In this particular example, the search box is configured to search within a university's library and bookstore database, while in other embodiments the search box may search the contents of the device or some other remote or local database. The user may interact with the touch screen using a finger, an active or passive stylus, or any other suitable implement. In this example, the user has selected the textbook icon and is depositing it within the search box. When the user begins dragging the textbook icon from its original location, an icon that is shaded or otherwise diminished in appearance may remain in the original location while the user performs the drag-and-drop gesture, in some embodiments. In this example, the search box not only receives the content icon, but is shown enlarged in order to more easily receive the content icon.

In this example, by dropping the textbook icon into the search box the device is prompted to search a university's online database for content similar to *Calculus* 1, 2013 *Edition*. In some embodiments, an online database may include previous editions of a textbook, may be linked to a university bookstore containing price listings of new and used copies of textbooks, and may organize textbooks based on class or professor. In this example, the similar content search has identified books similar to *Calculus* 1, 2013 *Edition*, previous editions of the textbook, and used copies of the textbook for sale through the university's bookstore. Once the database has been searched for similar content, the results may be displayed to the user with a discovery animation that shows the similar content emerging from the search box, as shown in FIG. 6b. In this example, in order to highlight the newly discovered content, the original textbook icon is shaded and appears in a background frame with respect to the discovered content.

In this example, the animation may show the content icons gliding over the device screen and eventually coming to rest in separate groups based on similar characteristics. As can be seen in FIG. 6c, three groups are identified to the user, each identified with an appropriate header. Separating the newly discovered content into groups may provide structure to the content discovery process or otherwise enhance the user experience. As discussed above, in some cases the user can repeat the discovery process in the result by picking a group of content and dropping it back into the search box or icon. In this particular example, the group labeled "Similar to Calculus 1" includes other higher level math textbooks listed in the university's database; the group labeled "2013 Edition Used" includes a selection of used textbooks and their listed prices; and the group labeled "Previous Editions" includes previous editions of that textbook that are listed in the university's database.

Note that numerous alternative embodiments will be apparent in light of this disclosure. For instance, in some embodiments the content being inserted into the search box may include phrases, words, songs, images, or any content that can be identified based on one or more identifiable characteristic. In some such examples, the drag and drop discovery mode may present the user with words having similar meanings, translations of words or phrases into different languages, similar songs or images, or any content sharing at least one identifiable characteristic. Note that the example characteristics and group arrangements discussed and illustrated herein are presented for illustrative purposes only, and additional characteristics and organizational arrangements will be apparent in light of this disclosure.

Methodology

Figure 7:
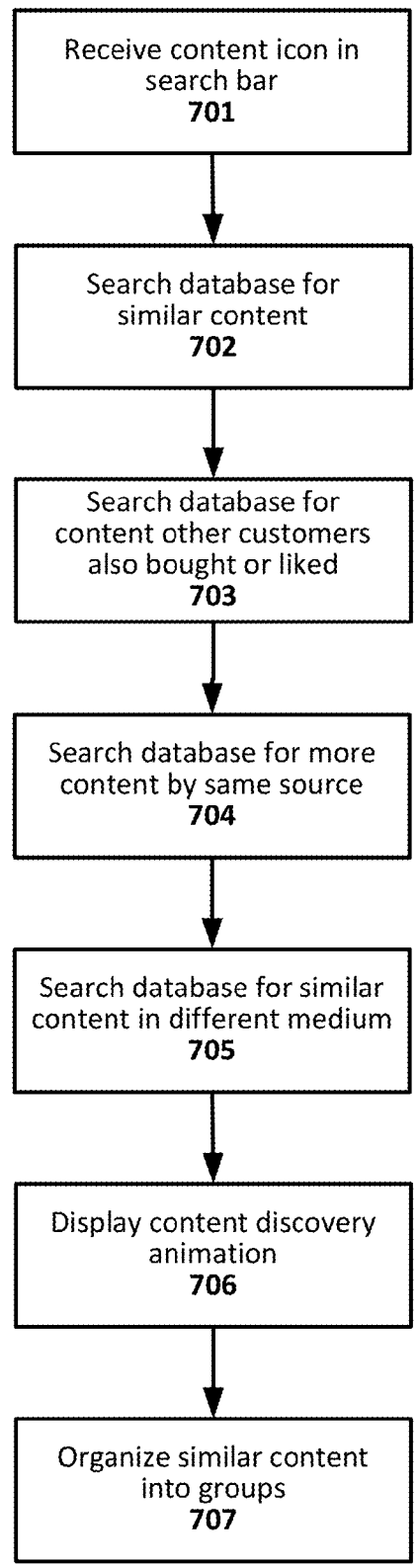
FIG. 7 illustrates a method for providing a drag and drop discovery mode in an electronic touch screen device, in accordance with an embodiment of the present invention.

FIG. 7 illustrates a method for providing a drag and drop discovery mode in an electronic touch sensitive screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the UI can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a drag and drop discovery mode as variously described herein, as will be appreciated in light of this disclosure.

In this example case, the method includes receiving 701 a content icon in the search box UI displayed on the touch screen device. As previously explained, the drag and drop discovery mode may be always enabled and/or configured from the factory in some embodiments, while other embodiments may be configured and/or enabled by the user. In some embodiments, a graphic may show the search box increase in size or otherwise change appearance when the user is depositing a content icon. As mentioned above, in some embodiments, the entry point of the drag and drop discovery mode can be a search icon instead of a search box, and the search icon can transform into a search box so that the content icon can slide in. Once a content icon has been deposited into the search box, the method may continue with searching 702 a database for similar content. In some embodiments, the database being searched may be an online store, a music library, a university library database, the user's own music or video library, or any other local or remote database. Searching for similar content may include identifying content within a genre or sharing similar characteristics, such as high-level mathematics textbooks, different editions of the same book, used copies of book or movie for sale, classic black-and-white American films, 1920's American literature, diet cookbooks, acoustic folk music, just to name a few examples. More generally, any content sharing an identifiable characteristic with the content being searched may be identified as similar content. The method may continue with searching 703 the database for similar content that other online customers bought or liked. In some embodiments, an online database may track an online shopper's purchase history, as well as what ratings online customers give to different items. In such embodiments, if an online customer who purchases one item often purchases a second item as well (either in the same shopping session or at different times), the two items may be identified as similar. Likewise, if a large number of those who give high ratings to one item also give high ratings to a second item, those two items may be identified as similar based on customer preference. The method may continue with searching 704 the database for more content by the same source. In some embodiments, such content may include books by the same author, songs by the same artist or band, movies by the same director, or lecture materials by the same professor. The method may continue with searching 705 the database for similar content in a different medium. Such content may include a film adaptation of a book, the book which a film is based upon, or a music video for a particular song, just to name a few examples.

Once the database has been searched, the method may continue with displaying 706 a content discovery animation on the touch screen device. In some embodiments, the content discovery animation shows a group of similar content icons emerging or flowing out from the search box, decelerating, and coming to rest on the device screen. The animation may show the similar content icons gliding over the device screen, bouncing off each other, or bouncing off the edges of the device screen as they decrease in speed after emerging from the search box. In some embodiments, the content may randomly cover all or a portion of the device screen and a suitable header may be displayed to identify the similar content. In order to highlight the newly discovered content, once the similar content is being displayed to the user any other content or application icons on the screen may be shaded, moved into a background frame, or otherwise diminished in appearance, in some embodiments. The method may continue with organizing 707 the similar content into groups. In one embodiment, the content discovery animation shows the similar content gliding over the device screen and coming to rest in separate groups based on similar characteristics. Example groups include content within the same genre, content by the same source (e.g., content by the same author, singer, director, or professor), content which other online shoppers also bought or rated highly, related content in a different medium (e.g., film adaptations of a novel or play, or music videos for a song), just to name a few examples. Each group may be outlined or identified with an appropriate header, in some embodiments. Separating the newly discovered content into groups may provide structure to the content discovery process or otherwise enhance the user experience. As discussed above, in some cases the user can repeat the discovery process in the result by picking a group of content and dropping it back into the search box or icon.

Numerous variations and embodiments will be apparent in light of this disclosure. One example embodiment of the present invention provides a device including a touch screen display for displaying digital content to a user and allowing user input. The device also includes a user interface including a user interface including a user interface including a drag and drop discovery mode configured to activate in response to a user depositing a first piece of content into a search box, wherein the drag and drop discovery mode is further configured to display a content discovery animation showing a plurality of similar contents emerging from the search box. In some cases, the content discovery animation is further configured to show the similar contents decelerating and coming to rest scattered over the touch screen display. In some cases, the similar content includes content sharing at least one identifiable characteristic with the first piece of content. In some such cases, the at least one identifiable characteristic is user-configurable. In other such cases, the content discovery animation is further configured to show the similar contents coming to rest into groups based on one or more of the at least one identifiable characteristic. In some such cases, the content discovery animation is further configured to show a header identifying the at least one identifiable characteristic of each group. In some cases, the first piece of content is deposited into the search box by a drag and drop touch screen gesture. In some cases, the search box increases in size while the first piece of content is being deposited into the search box. In some cases, the drag and drop discovery mode is accompanied by at least one sound effect. In some cases, all content other than the similar contents shown on the touch screen display has a diminished appearance. In some cases, the device is an eReader device or a tablet computer or a smartphone.

Another example embodiment of the present invention provides a mobile computing system including a processor and a touch screen display for displaying content to a user and allowing user input, and a user interface executable on the processor and including a drag and drop discovery mode, wherein the drag and drop discovery mode is configured to display a plurality of similar contents emerging from the search box in response to a user depositing a first piece of content into a search box, and wherein the similar contents includes content sharing at least one identifiable characteristic with the first piece of content. In some cases, the drag and drop discovery mode is further configured to display the similar contents decelerating and coming to rest scattered over a portion of the touch screen display. In some cases, the at least one identifiable characteristic is user-configurable.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to receive a first piece of content in a search box, search a database for similar content, wherein the similar content shares at least one identifiable characteristic with the first piece of content, and display a content discovery animation showing similar content emerging from the search box. In some cases, the search box is configured to receive the first piece of content via a drag and drop touch screen gesture. In some cases, the search box is configured to increase in size when receiving the first piece of content. In some cases, the electronic device is remotely connected to the database. In some cases, the content discovery animation is further configured to show the similar content decelerating and coming to rest scattered over a portion of a touch screen display. In some such cases, all content shown on the touch screen display other than the similar content has a diminished appearance.

The foregoing description of the embodiments of the invention has been presented for the purposes of illustration and description. It is not intended to be exhaustive or to limit the invention to the precise form disclosed. Many modifications and variations are possible in light of this disclosure. For example, while the discovery techniques described herein are provided in the context of touch sensitive devices, they could also be used with any computing system (e.g., desktops, laptops, etc.) where the user can provide content selection and input using other user input mechanisms such as mouse and keyboard. It is intended that the scope of the invention be limited not by this detailed description, but rather by the claims appended hereto.

What is claimed is:

1. A device, comprising:
    a touch screen display for displaying content to a user and allowing user input; and
    a user interface including a drag and drop discovery mode configured to activate in response to a user depositing a first piece of content into a search box, wherein the drag and drop discovery mode is further configured to display a content discovery animation showing a plurality of similar contents emerging from the search box, and wherein the content discovery animation is further configured to show the similar contents decelerating and coming to rest scattered over at least a portion of touch screen display.

2. The device of claim 1 wherein at least some of the scattered similar contents are organized into a group.

3. The device of claim 1 wherein the similar contents comprises content sharing at least one identifiable characteristic with the first piece of content.

4. The device of claim 3 wherein the at least one identifiable characteristic is user-configurable.

5. The device of claim 3, wherein the content discovery animation is further configured to show the similar contents coming to rest into groups based on one or more of the at least one identifiable characteristic.

6. The device of claim 5 wherein the content discovery animation is further configured to show a header identifying the at least one identifiable characteristic of each group.

7. The device of claim 1 wherein the search box is accessible by a drag and drop touch screen gesture.

8. The device of claim 1 wherein the search box visually increases in size while the first piece of content is being deposited into the search box.

9. The device of claim 1 wherein the content discovery animation is accompanied by at least one sound effect.

10. The device of claim 1 wherein all content other than the similar contents shown on the touch screen display has a diminished appearance.

11. The device of claim 1 wherein the device is an eReader device or a tablet computer or a smartphone.

12. A mobile computing system, comprising:
    a processor and a display for displaying content to a user and a touch sensitive surface for allowing user input; and
    a user interface executable on the processor and including a drag and drop discovery mode, wherein in response to a user depositing a first piece of content into a search box, the drag and drop discovery mode is configured to display a plurality of similar contents emerging from the search box, and wherein the similar contents comprises content sharing at least one identifiable characteristic with the first piece of content, and wherein the drag and drop discovery mode is further configured to display the similar contents decelerating and coming to rest scattered over at least a portion of the display.

13. The system of claim 12 wherein the scattered similar contents are organized into two or more labeled groups.

14. The system of claim 12 wherein the at least one identifiable characteristic is user-configurable.

15. A non-transitory computer program product comprising a plurality of instructions encoded thereon that when executed by one or more processors facilitate operation of an electronic device according a process, the process comprising:
    receive a first piece of content in a search box;
    search a database for similar content, wherein the similar content shares at least one identifiable characteristic with the first piece of content; and
    present for display a content discovery animation that depicts similar content flowing from the search box and continuing to glide over at least a portion of display area before finally coming to rest within the display area.

16. The computer program product of claim 15 wherein the search box is configured to receive the first piece of content via a drag and drop based action.

17. The computer program product of claim 15 wherein the search box is configured to visually increase in size for at least part of the time when receiving the first piece of content.

18. The computer program product of claim 15 wherein after flowing from the search box, the similar content at least one of bounces off each other and virtual edges of the electronic device before coming to rest.

19. The computer program product of claim 15 wherein the content discovery animation is further configured to show the similar content decelerating before coming to rest at random locations with the display area.

20. The computer program product of claim 19 wherein all displayed content other than the similar content has a diminished appearance, and the first piece of content is distinguished in appearance from other displayed content while the similar content is displayed.

21. A computing system comprising the computer program product of claim 15.

* * * * *